(12) United States Patent
Rameau et al.

(10) Patent No.: US 12,505,842 B2
(45) Date of Patent: Dec. 23, 2025

(54) DEVICES, SYSTEMS, AND METHODS FOR PERSONAL SPEECH RECOGNITION AND REPLACEMENT

(71) Applicant: Cornell University, Ithaca, NY (US)

(72) Inventors: Anaïs Rameau, Ithaca, NY (US); Simon Dunham, Ithaca, NY (US); Fei Wang, Ithaca, NY (US)

(73) Assignee: Cornell University, Ithaca, NY (US)

( * ) Notice: Subject to any disclaimer, the term of this patent is extended or adjusted under 35 U.S.C. 154(b) by 292 days.

(21) Appl. No.: 17/614,022

(22) PCT Filed: May 28, 2020

(86) PCT No.: PCT/US2020/034917
§ 371 (c)(1),
(2) Date: Nov. 24, 2021

(87) PCT Pub. No.: WO2020/243299
PCT Pub. Date: Dec. 3, 2020

(65) Prior Publication Data
US 2022/0208194 A1     Jun. 30, 2022

Related U.S. Application Data

(60) Provisional application No. 62/854,128, filed on May 29, 2019.

(51) Int. Cl.
*G10L 15/24*      (2013.01)
*G06F 3/01*       (2006.01)
(Continued)

(52) U.S. Cl.
CPC .............. *G10L 15/24* (2013.01); *G06F 3/015* (2013.01); *G06T 7/64* (2017.01); *G06T 7/70* (2017.01);
(Continued)

(58) Field of Classification Search
CPC ....... G10L 15/24; G10L 15/063; G10L 15/16; G10L 15/197; G10L 15/22
See application file for complete search history.

(56) References Cited

U.S. PATENT DOCUMENTS 9,554,484 B2 *  1/2017  Rogers .................. H05K 1/189
10,621,973 B1 *  4/2020  McVicker ................ H04R 1/14
(Continued)

FOREIGN PATENT DOCUMENTS

CN         101163440 A  *  4/2008  ........... A61B 5/0002
WO    WO-2014/176420       10/2014

OTHER PUBLICATIONS

International Preliminary Report on Patentability on PCT PCT/US2020/034917 Dtd Dec. 9, 2021.
International Search Report and Written Opinion on PCT PCT/US2020/034917 Dtd Sep. 2, 2020.

*Primary Examiner* — Daniel C Washburn
*Assistant Examiner* — Paul J. Mueller
(74) *Attorney, Agent, or Firm* — Foley & Lardner LLP

(57) ABSTRACT

The present disclosure describes approaches to voice restoration using personal devices that detect surface electromyographic (sEMG) signals from articulatory muscles for the recognition of silent speech in a patient (such as a patient with total laryngectomy, on voice rest, etc.). A personal device may comprise a cutaneous sensor unit and a control module that wirelessly transmits signals to a computing device capable of, for example, applying a predictive model to signals to generate text or synthesize speech. Methods and systems for training and applying predictive models, and fabricating personal devices, are disclosed.

25 Claims, 9 Drawing Sheets

(51) Int. Cl.
  *G06T 7/64* (2017.01)
  *G06T 7/70* (2017.01)
  *G09B 21/00* (2006.01)
  *G10L 15/06* (2013.01)
  *G10L 15/16* (2006.01)
  *G10L 15/197* (2013.01)
  *G10L 15/22* (2006.01)

(52) U.S. Cl.
  CPC ........... *G09B 21/00* (2013.01); *G10L 15/063* (2013.01); *G10L 15/16* (2013.01); *G10L 15/197* (2013.01); *G10L 15/22* (2013.01); *G06T 2207/30201* (2013.01)

(56) References Cited

U.S. PATENT DOCUMENTS

| | | | |
|---|---|---|---|
| 2005/0027529 A1* | 2/2005 | Manabe | G10L 15/24 704/E15.041 |
| 2010/0106044 A1 | 4/2010 | Linderman | |
| 2015/0235651 A1* | 8/2015 | Sharifi | G10L 15/20 704/233 |
| 2016/0055368 A1* | 2/2016 | Cao | G06F 18/2431 382/195 |
| 2016/0314781 A1* | 10/2016 | Schultz | A61B 5/394 |
| 2017/0084266 A1 | 3/2017 | Bronakowski et al. | |
| 2017/0246076 A1* | 8/2017 | Miller | A61H 23/02 |
| 2019/0343457 A1* | 11/2019 | Rahmani | G06N 3/08 |

* cited by examiner

DEVICES, SYSTEMS, AND METHODS FOR PERSONAL SPEECH RECOGNITION AND REPLACEMENT

CROSS REFERENCE TO RELATED APPLICATIONS

This application is a U.S. National Phase Application under 35 U.S.C. § 371 of International Application No. PCT/US2020/034917 entitled DEVICES, SYSTEMS, AND METHODS FOR PERSONAL SPEECH RECOGNITION AND REPLACEMENT, filed on May 28, 2020, which claims priority to U.S. Provisional Patent Application No. 62/854,128 entitled "WEARABLE SPEECH RECOGNITION DEVICE," filed May 29, 2019, all of which are incorporated herein by reference in their entireties.

STATEMENT REGARDING FEDERAL FUNDING

This invention was made with government support under Grant No. UL1-TR-002384 awarded by the National Center for Advancing Translational Sciences (NCATS) and Contract No. TR002384 awarded by the National Institutes of Health (NIH). The government has certain rights in the invention.

BACKGROUND

Total laryngectomy is performed for treatment of primary or recurrent laryngeal cancer, and narrow field laryngectomy is more rarely offered for functional management of severe swallowing dysfunction with high risk of aspiration. Between 50,000 to 60,000 individuals have a laryngectomy in the US, with an estimated 3000 new laryngectomees every year. This incidence represents a decline compared to decades preceding the 1991 VA laryngeal cancer study group and the advent of organ preservation therapy. Combined with the decreasing incidence of laryngeal cancer, laryngectomy procedure is less frequent in the West. Paradoxically, an increase in the global numbers of laryngectomy is expected with the rising absolute number of smokers and the lack of access to radiotherapy in the developing world setting.

Perhaps as a result of the relatively small and declining number of laryngectomy patients in the developed world and the existence of functional voice restoration options, innovations in voice rehabilitation, other than improvement of current modalities, have stagnated. Currently, the two main methods of voice restoration are the electrolarynx and the tracheoesophageal puncture valve (TEP). The electrolarynx was introduced in the late 1920s, while the TEP valve was first described by Singer and Blom in 1980. The electrolarynx is characterized by a single frequency vibration transmitted via an external device to the oral and pharyngeal mucosa, resulting in a monotonous "robotic" voice quality with limited use in tonal languages, such as mandarin.

TEP speech represents the preferred modality of voice restoration post-laryngectomy, as it provides greater intelligibility and a wider intonation range than the electrolarynx. The TEP requires a surgical insertion and regular prosthetic changes with a speech pathologist. It is associated with complications, including leakage and granulation. Even with the state-of-the-art voice rehabilitation using the TEP, patients with laryngectomy experience limited phonatory capacity, with a lower and variable fundamental frequency, less aerodynamic control and decreased dynamic range. Voice intensity and intelligibility over background noise are two variables in TEP speech that correlate with greater quality of life. Laryngectomees who are less satisfied with their vocal quality report making fewer phone calls, being more anxious about speaking with others and having fewer friends. These modalities for voice restoration after laryngectomy (the electrolarynx and the tracheoesophageal puncture) have limitations and new technologies may offer innovative alternatives via silent speech.

SUMMARY

In one aspect, various embodiments of the disclosure relate to a system for recognizing speech by detecting surface electromyographic (sEMG) signals from a face and/or a neck of a subject. The subject may be any patient with limited phonation capacity, including: patients with stroke and hemifacial paralysis, patients with tracheostomy, patients who are intubated in the ICU and coming off sedation, any patient with dysphonia, etc. The speech may be "silent," such as alaryngeal speech of a subject who may have undergone a total laryngectomy. The system may include a personal device. The personal device may comprise a sensor unit comprising cutaneous sensors such as a set of electrodes. The electrodes or other sensors may be configured to detect sEMG signals from articulatory muscles of the subject. The sensor unit may comprise one or more electrodes for each articulatory muscles. The sensor unit may be configured to detect sEMG signals during (silent) utterances by the subject. The personal device may comprise a control module coupled to the electrodes (or other sensors) via a corresponding set of electrical pathways. The control module may comprise a signal acquisition circuit. The signal acquisition circuit may be configured to acquire sEMG signals detected by the electrodes. The sEMG signals may be acquired by the signal acquisition circuit via corresponding electrical pathways. The personal device may comprise a wireless communication circuit configured to transmit data to a computing device for recognition of words or phrases spoken by the subject. The data may correspond to the signals acquired via the signal acquisition circuit.

In various embodiments, the personal device may be configured to detect sEMG signals from a location tailored to the subject's anatomy. sEMG signals may be detected from, for example, a hemi-face of the subject or both sides of the face of the subject, depending on, for example, the subject's anatomy. In various embodiments, sEMG signals may be detected, for example, from one side of the subject's face only, from one side of the subject's face as well as a same side of the subject's neck, from one side of the subject's face as well as an opposing side of the subject's neck, from both sides of the subject's face and one side of the subject's neck, or from both sides of the subject's face and both sides of the subject's neck. The speech recognition may be based on sEMG signals detected, for example, at one side of the subject's face only, at one side of the subject's face as well as a same side of the subject's neck, from one side of the subject's face as well as an opposing side of the subject's neck, from both sides of the subject's face and one side of the subject's neck, or from both sides of the subject's face and both sides of the subject's neck.

In various embodiments, the sensor unit may comprise a housing or body for the electrodes and/or electrical pathways. The housing or body may be, for example, a membrane. The electrodes and/or electrical pathways may be embedded in the membrane. The housing or body may be contoured so as to mate with a surface contour of the subject's face and/or neck.

In various embodiments, the sensor unit may include a facial electrode tattoo. The facial electrode tattoo may comprise a membrane, the set of electrodes, and/or the set of electrical pathways. The electrodes and/or electrical pathways may be embedded in the membrane.

In various embodiments, the sensor unit may comprise a membrane, such as a polyurethane membrane or otherwise a membrane comprising polyurethane. The membrane may have a thickness of no greater than about 1 millimeter, a thickness no greater than about 1.0 millimeters, a thickness no greater than about 0.5 millimeters, a thickness no greater than about 300 microns, a thickness no greater than about 200 microns, a thickness no greater than about 100 microns, a thickness of no greater than about 50 microns, a thickness no greater than about 30 microns, or a thickness between about 20 microns and about 30 microns, for example.

In various embodiments, the electrical pathways may comprise a conducting film, such as a metalized conducting film. The film may comprise, for example, polyethylene terephthalate (PET), polytetrafluoroethylene (PTFE), polyimides, and/or polyvinyl chloride (PVC).

In various embodiments, the personal device may comprise a configurable array and/or a reconfigurable array of redundant electrical pathways.

In various embodiments, the sensor unit may be configured to interface with a hemi-face of the subject. The sensor unit may comprise a membrane configured to adhere to the face of the subject. The sensor unit (or membrane thereof) may be configured to adhere to the hemi-face of the subject.

In various embodiments, the signal acquisition circuit may comprise an amplifier configured to amplify sEMG signals acquired via the electrodes or other sensors.

In various embodiments, the personal device (or sensor unit) may comprise at least two non-reference electrodes (and one, two, or more reference electrodes). The personal device may comprise, for example, 3, 4, 5, 6, 7, 8, 9, 10, 11, 12, 13, 14, 15, or 16 electrodes positioned on one or both sides of a subject's face and/or neck.

In various embodiments, the system may further comprise the computing device. The computing device may comprise a processor configured to receive data from the personal device (or control module thereof). The computing device may be configured to generate predictions of words uttered by the subject. The predictions may be generated based on the detected sEMG signals.

In various embodiments, the processor of the computing device may be configured to apply a predictive machine learning model to data that is based on or otherwise corresponding to detected sEMG signals. The data to which the predictive model is applied may be received from the personal device (e.g., the control module), or may be derived from or otherwise based on signals or other data received from the personal device. The predictive machine learning model may be trained using recordings of signals corresponding to discrete syllables, words, and/or phrases spoken by one or more subjects.

In various embodiments, a general predictive model may be trained using a multitude of subjects, and the predictive model fine-tuned according to each individual. For example, the general predictive model may be trained on a relatively larger dataset corresponding to a relatively larger set of utterances, and the general predictive model further trained using a relatively smaller patient-specific dataset based on a relatively smaller set of utterances. In certain embodiments, patient-specific utterances may be selected, for example, to represent sounds or words that exhibit more similarly in the patient than in the subjects used to train the general predictive model. For example, if differences between a patient's utterances of particular words are relatively nuanced, such that, for example, sEMG signals from the particular utterances are not reliably distinguishable using the general predictive model, the general predictive model may be further trained using a dataset that includes the patient's utterances of those particular more nuanced utterances.

In another aspect, various embodiments of the disclosure relate to a method for recognizing speech by a subject based on surface electromyographic (sEMG) signals. The subject may be any patient with limited phonation capacity, such as patients with stroke and hemifacial paralysis, patients with tracheostomy, patients who are intubated in the ICU and coming off sedation, any patient with dysphonia, etc. The speech may be, for example, silent speech of a subject who may have undergone a total laryngectomy. The method may comprise detecting sEMG signals from articulatory muscles in a face and/or a neck of the subject. The sEMG signals may be detected using a cutaneous sensor unit of a personal device. The sEMG signal may be detected during silent utterances by the subject. The cutaneous sensor unit may comprise one or more electrodes or other sensors positioned at each articulatory muscle. Each electrode may be coupled to a control unit of the personal device via an electrical pathway. The method may comprise applying a predictive machine learning model to data that corresponds to, or is based on, the detected sEMG signals. The predictive model may be applied by a computing device. The predictive model may be fed data that is received from, derived from, or based on detected sEMG signals or other data received from the personal device. The computing device may receive sEMG signals or data corresponding to the sEMG signals from the personal device. The predictive model may be applied to generate predictions of words and/or phrases uttered by the subject. The predictive machine learning model may be trained using data recordings which may comprise discrete words and/or discrete phrases spoken or otherwise uttered by one or more subjects. The method may comprise presenting the predictions of words and/or phrases uttered by the subject to the subject and/or to others. The predictions may be provided by the computing device. The predictions may be provided as, for example, readable text on a display (e.g., a display of the computing device or other device) and/or as audible synthesized speech from an audio source (e.g., a speaker of the computing device or other device).

In various embodiments, the electrodes and/or the electrical pathways may be embedded in a membrane. The membrane may be adherable to a hemi-face of the subject.

In various embodiments, the method may further comprise positioning the personal device. The personal device may be positioned unilaterally (e.g., for detection of signals from one side of the subject's face and/or neck) or bilateral (e.g., detection of signals from both sides of the subject's face and/or neck). The personal device may be positioned such that the electrodes (or other sensors) make contact with the plurality of articulatory muscles at one or both sides of the subject's face and/or neck. The position of the personal device may be selected, for example, to remain outside of the radiation field, with the sensors positioned at areas which have suffered less radiation and surgery-related fibrosis. In case a patient has any paralysis (due to, e.g., a stroke), the position of the personal device may additionally or alternatively be selected, for example, based on the functionality of the muscles. For example, the personal device may be positioned at a functional (e.g., non-paralyzed or otherwise relatively more functional) hemiface of the patient.

In various embodiments, the method may further comprise scanning (using, e.g., a 3D scanner or other imaging device) the face (e.g., a hemi-face) of the subject to obtain facial geometry data. The electrodes (or other sensors) may be positioned based on the facial geometry data.

In another aspect, various embodiments of the disclosure relate to a method for training a machine learning predictive model. The predictive model may be trained to predict words and/or phrases uttered by subjects (e.g., subjects with limited phonation capacity, such as patients with stroke and hemifacial paralysis, patients with tracheostomy, patients who are intubated in the ICU and coming off sedation, any patient with dysphonia, etc., during silent speech) based on surface electromyographic (sEMG) signals. The method may comprise detecting sEMG signals from articulatory muscles in a face (e.g., a hemi-face) of a subject during silent utterances of a set of words or phrases. The sEMG signals may be detected using a cutaneous sensor unit of a personal device. The cutaneous sensor unit may comprise a set of electrodes or other sensors positioned at articulatory muscles of the subject. The method may comprise generating a recording dataset comprising a plurality of words and/or phrases. The recording dataset may comprise, for each word or phrase, a set of signals corresponding to the set of electrodes of the cutaneous sensor unit. The recording dataset may comprise, for example, for a first word, a first set of recordings corresponding to signals from each electrode (e.g., a first electrode, a second electrode, etc.), for a second word, a second set of recordings corresponding to signals from each electrode, for a third word, a third set of recordings corresponding to signals from each electrode, and so forth. The recording may be generated via a computing device. The method may comprise identifying differences between signals corresponding to the plurality of words and/or phrases. The method may comprise selecting distinct features of the words and/or phrases. The identifying and/or selecting may be performed via the computing device. The method may comprise generating a training dataset from the recording dataset. The method may also comprise generating a validation dataset from the recording dataset. The recording dataset may be split into the training dataset and the recording dataset. The training dataset and the validation dataset may be generated via the computing device. The method may comprise selecting a classifier. The classifier may be selected based on the training dataset and the validation dataset. The classifier may be selected via the computing device. The method may comprise training the predictive model. The predictive model may be configured to receive as inputs data based on sEMG signals that are detected during utterances by the subject. The predictive model may be configured to generate predicted words or phrases as outputs based on the classifier.

In various embodiments, the predictive model may be a cascaded machine learning model. The cascaded machine learning model may comprise global shape matching, local feature extraction, and classification.

In another aspect, various embodiments of the disclosure relate to a method for applying a machine learning predictive model. The predictive model may be trained to predict words and/or phrases uttered by subjects (e.g., subjects with limited phonation capacity, such as patients with stroke and hemifacial paralysis, patients with tracheostomy, patients who are intubated in the ICU and coming off sedation, any patient with dysphonia, etc., during silent speech) based on surface electromyographic (sEMG) signals. The method may comprise detecting sEMG signals from articulatory muscles in faces (e.g., hemi-faces) of subjects during silent utterances of sets of words or phrases. The sEMG signals may be detected using cutaneous sensor units of personal devices. The cutaneous sensor units may comprise sets of electrodes or other sensors positioned at articulatory muscles of the subjects. The sEMG signals may be used to generate a recording dataset which may comprise, for each word or phrase, a set of signals corresponding to the set of electrodes of the cutaneous sensor unit. The method may comprise pre-processing the recording dataset to generate a pre-processed dataset. The pre-processing may be performed via a computing device. The pre-processed dataset may be fed to a predictive model configured to perform cascaded classification. The cascaded classification may be performed via the computing device. Performing cascaded classification may comprise performing global shape matching on the pre-processed dataset to generated shape-matched data. Cascaded classification may comprise performing local feature extraction on the shape-matched data to generate a feature dataset. Cascaded classification may comprise performing classification on the feature dataset. Performing classification may comprise applying a trained classifier to the feature dataset. The predictive model may generate predicted words or phrases as outputs based on the classifier.

In another aspect, various embodiments of the disclosure relate to a method of manufacturing a personal device. The personal device may be configured for detecting surface electromyographic (sEMG) signals from a face and/or a neck of a subject, such as a hemi-face of the subject. The method may comprise obtaining three-dimensional (3D) contour data. The 3D contour data may be acquired by scanning, using a 3D scanner or other imager, a face and/or a neck of a subject (who may have, for example, undergone a laryngectomy procedure). The method may comprise extracting 3D geometry data from the contour data. The 3D geometry data may be extracted via a computing device. The method may comprise identifying a set of positions corresponding to articulatory muscles of the subject. The set of positions may be identified via the computing device. The method may comprise generating fabrication data for a membrane and/or for a set of electrodes. The fabrication data may be generated by the computing device. The fabrication data for the set of electrodes may correspond to the set of positions of the articulatory muscles. Generating the fabrication data may comprise digitally flattening the contour data. The method may comprise fabricating the membrane and/or the set of electrodes using the fabrication data.

In another aspect, various embodiments of the disclosure relate to a personal device for recognizing speech by detecting surface electromyographic (sEMG) signals from a face and/or a neck of a subject. The speech may be silent speech of a subject who may have, for example, undergone a total laryngectomy. The personal device may comprise a sensor unit comprising cutaneous sensors such as a set of electrodes. The electrodes or other sensors may be configured to detect sEMG signals from articulatory muscles of the subject. The sensor unit may comprise one or more electrodes for each articulatory muscles. The sensor unit may be configured to detect sEMG signals during (silent) utterances by the subject. The personal device may comprise a control module coupled to the electrodes (or other sensors) via a corresponding set of electrical pathways. The control module may comprise a signal acquisition circuit. The signal acquisition circuit may be configured to acquire sEMG signals detected by the electrodes. The sEMG signals may be acquired by the signal acquisition circuit via corresponding electrical pathways. The personal device may comprise a wireless communication circuit configured to transmit data to a computing device for recognition of words or phrases spoken by the subject. The data may correspond to the signals acquired via the signal acquisition circuit.

In another aspect, various embodiments of the disclosure relate to a system or a personal device which may comprise a contoured surface configured to mate with a surface contour of a subject's face and/or neck (e.g., one or both sides of the subject's face and/or neck). The system or personal device may comprise a plurality of electrodes at least partially embedded in the contoured surface. The system or personal device may comprise a control module configured to receive a plurality of signals from the plurality of electrodes and select an output word or phrase based on the plurality of signals using a machine learning predictive model.

In various embodiments, the present disclosure describes personalized systems, devices, and methods for voice restoration based on surface electromyographic (sEMG) signals from articulatory muscles in patients. Recognition of silent speech (e.g., in a patient with total laryngectomy) may be achieved by applying machine learning modeling to detected sEMG signals. The system may record sEMG signals of articulatory muscles from the face and neck of a subject who articulates words silently. These sEMG signals may be used for automated speech recognition via predictive models. Sensor placement was tailored to the patient's unique anatomy. In one example, using seven sEMG sensors on a subject's face and neck and two grounding electrodes, the system recorded EMG data while the subject was mouthing "Tedd" and "Ed." In example embodiments, 92% accuracy was achieved in the recognition of 10 digits, 100 utterance of each digit from 2 subjects. The patient's silent mouthed speech may be translated into text and synthesized speech as an alternative means of communication.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
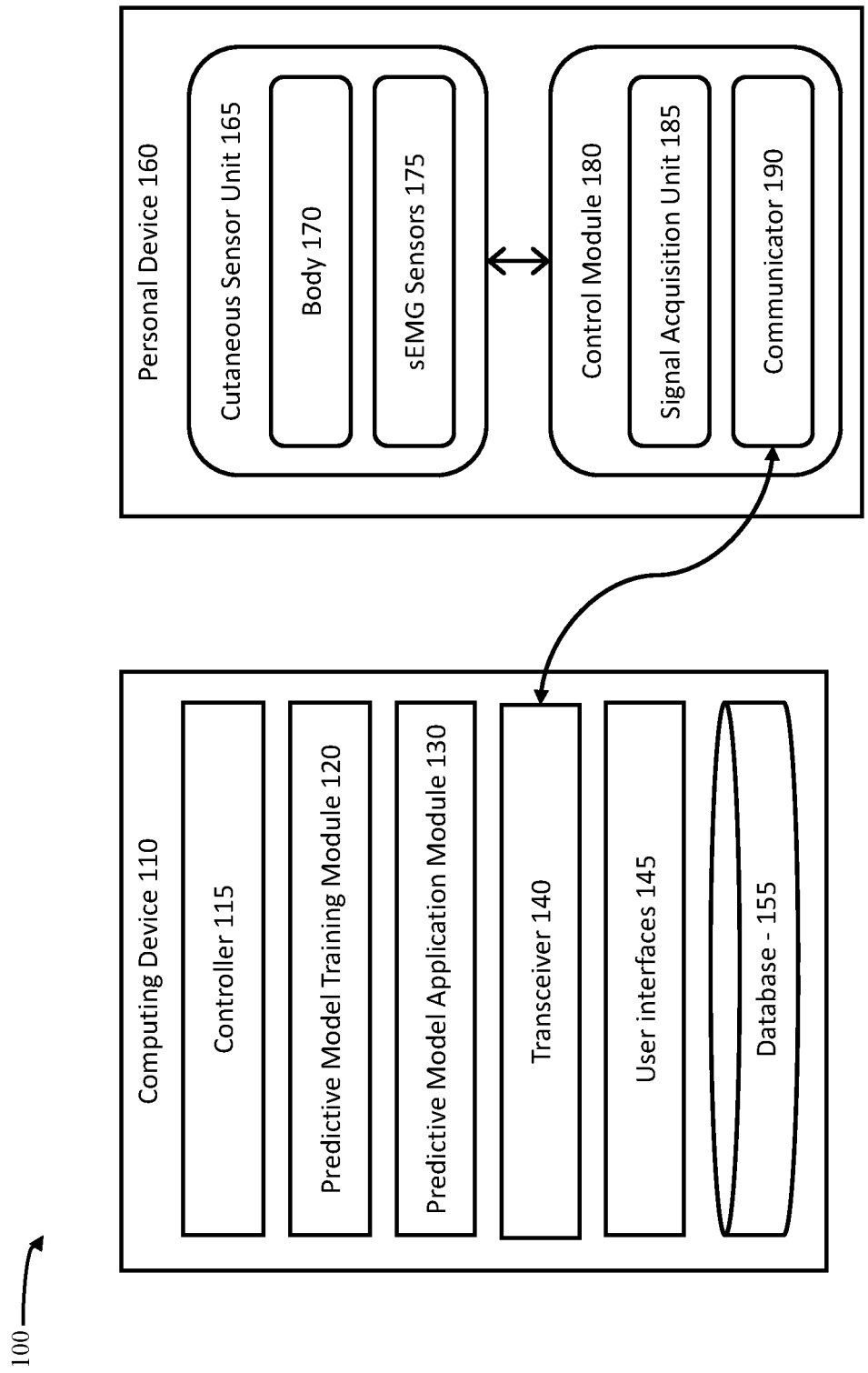
FIG. 1 illustrates a system with a personal surface electromyographic (sEMG) detection device which may be in communication with a computing device according to various potential embodiments.

Various embodiments relate to personalized systems, methods, and devices for voice restoration using machine learning applied to EMG signals from articulatory muscles for the recognition of silent speech in patients with laryngectomy. In some implementations, the system can be housed in a body or housing customized to the surface contours of the subject's face or other anatomy. The system can include a plurality of EMG electrodes. The EMG electrodes can be embedded in the housing. For example, the housing can mate to the subject's face at a predefined orientation, which places the electrodes within the housing at predefined locations on the subject's anatomy. The electrodes can include, for example, disposable 24 mm Ag/AgCl surface EMG electrodes with integrated gel (Kendall, Covidien, Mansfield, MA, USA). The electrode can be placed on, for example, five articulatory muscles, such as on the non-radiated hemi-face of the laryngectomee volunteer: obicularis oris, mentalis, depressor anguli oris, levator labii superioris and risorius. Articulatory muscles may be located in an automated fashion based on distinguishing anatomical and/or functional features. The non-radiated anterior and posterior digastric muscles may be used as surrogates for the intrinsic and extrinsic muscles of the tongue. The system can include two reference electrodes, such as one reference electrode on the mastoid tip and another reference electrode on the auricle.

The disclosed approach may be used to enable silent speech in any subject with limited phonation capacity, including: patients with stroke and hemifacial paralysis, patients with tracheostomy, patients who are intubated in the ICU and coming off sedation, any patient with dysphonia, etc.

Electrodes may be connected with an EMG/EEG snap electrode cable. Signal of the EMG electrodes may be processed, for example, via, for example, a suitable board with a 32-bit processor and 250 Hz data sampling rate, connected to a computing device via, for example, Bluetooth serial communication. The board may comprise medical grade amplifiers, and allow for minimization or reduction of noise via intuitive signal filtering and processing.

With sEMG electrodes in position, a subject may be asked to utter a set of syllables, words, sounds, and/or phrases. The set may be a representative set that includes sufficient variation to serve as a basis for other syllables, words, sounds, phrases, and/or combinations thereof that may be uttered during normal use of the personal device. In an example implementation, sEMG electrodes were positioned on a subject's target muscles, and the subject was asked to silently articulate the same word every 5 seconds for a total number of 75 silent utterances. To distinguish between two similar-sounding words, 75 silent articulations of "Tedd" and 75 silent articulations of "Ed" were recorded. This was used to demonstrate the feasibility of sEMG-based silent speech recognition, using tailored sensor placement and a personalized wearable device. Various embodiments employ silent speech recognition algorithms with increased vocabulary, decreased word error rate, and translation of silently articulated speech into a personalized synthesized voiced speech via portable devices. Various embodiments could be usable with patients with stroke with hemifacial paralysis, patients with tracheostomy and intolerance of the Passy-Muir valve, as well as patients needing to be on voice rest.

Referring to FIG. 1, in various embodiments, a system 100 may include a computing device 110 (or multiple computing devices, co-located or remote to each other) and a personal device 160 (which may be, for example, a wearable device for sensing sEMG signals). In potential embodiments, the personal device 160 may be integrated with the computing device 110 or components thereof. The computing device 110 (or multiple computing devices) may receive and analyze signals acquired via personal device 160. In certain implementations, computing system 110 may be used to control personal device 160. The computing device 110 may include one or more processors and one or more volatile and non-volatile memories for storing computing code and data that are captured, acquired, recorded, and/or generated. The computing device 110 may include a controller 115 that may be configured to exchange control signals with personal device 160 and/or control the analysis of data and interaction with users (e.g., so as to provide text or synthesized speech). The computing device 110 may also include a predictive model training module 120 for training predictive models, and a predictive model application module 130 for applying trained models.

A transceiver 140 allows the computing device 110 to receive and/or exchange readings, control commands, and/or other data with personal device 160. One or more user interfaces 145 allow the computing system to receive user inputs (e.g., via a keyboard, touchscreen, microphone, camera, etc.) and provide outputs (e.g., via a display screen, audio speakers, etc.). The computing device 110 may additionally include one or more databases 155 for storing, for example, signals acquired via one or more sensors. In some implementations, database 145 (or other components of computing device 110) may alternatively or additionally be part of another computing device that is co-located or remote and in communication with computing device 110 and/or with personal device 160.

Personal device 160 may include a cutaneous sensor unit 165 for detecting signals, and a control module for processing and/or transmitting signals to computing device 110. Cutaneous sensor unit 160 may comprise a body 170 such as a membrane or other housing. The cutaneous sensor unit 160 may also comprise a set of sensors for detecting sEMG signals from articulatory muscles of a subject. The cutaneous sensor unit 165 may be coupled to or otherwise in communication with a control module 180. The control module 180 may comprise a signal acquisition unit 185 that receives signals detected using sEMG sensors 175. Signal acquisition unit 185 may, for example, include amplifiers, filters, etc. Control module 180 may also include a communicator 190, which may comprise a wireless transmitter for communicating detected signals (or data corresponding thereto) to computing device 110. Communicator 190 may additionally comprise a wireless receiver so as to receive control signals from computing device 110.

Figure 2:
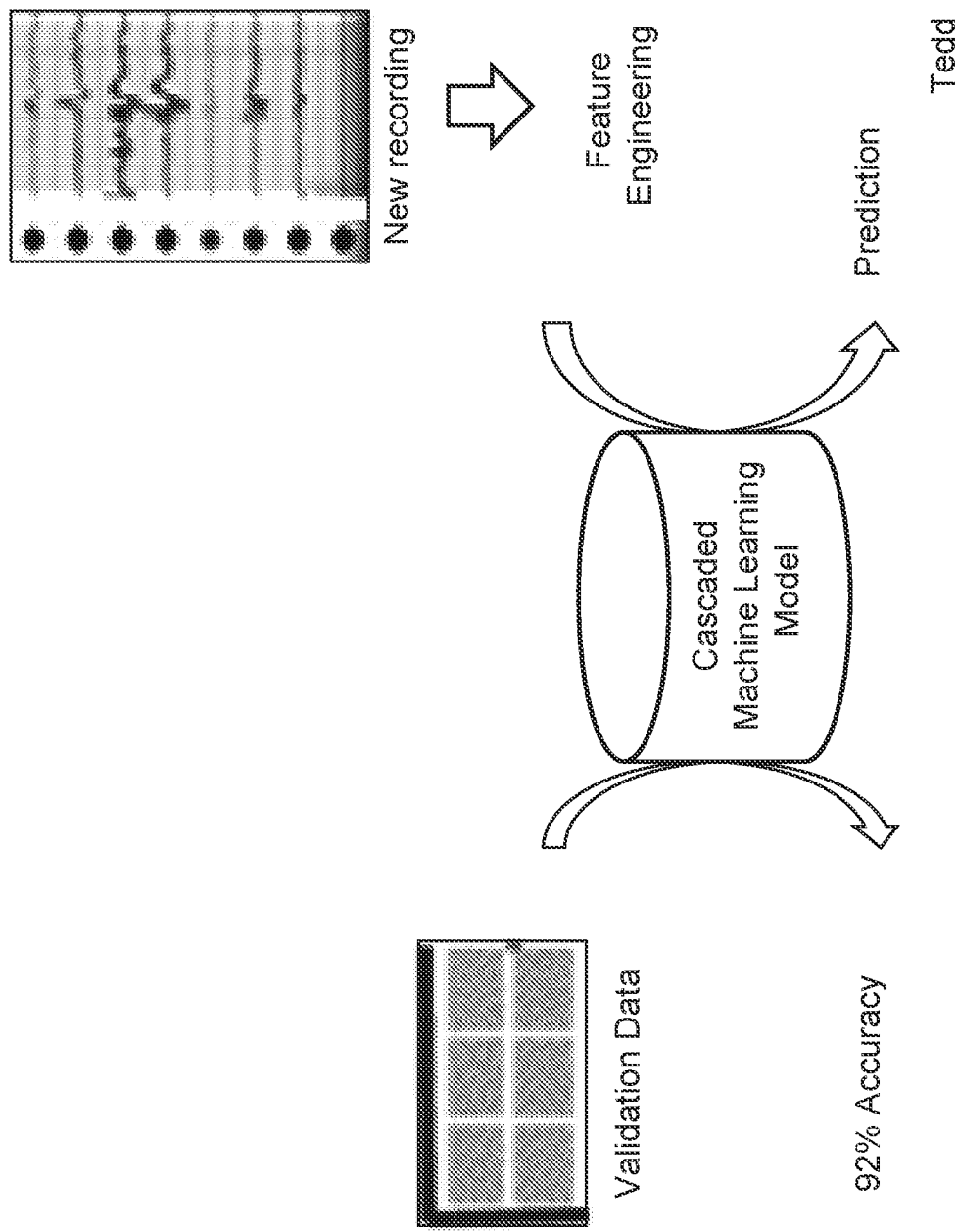
FIG. 2 illustrates an example cascaded machine learning model applied to validation data according to various potential embodiments.

Referring to FIG. 2, data collection may be performed using a personal device such as personal device 160 of FIG. 1. Data collection may comprise recording signals from a subject. During data collection, signals may be recorded from each electrode (e.g., six sensing electrodes and two reference electrodes) as the subject wearing the personal device utters each sound, word, or phrase (collectively referred to as "utterance"), such as "Ed" and "Tedd" as shown in FIG. 2. The signals may be used to generate a dataset (via, e.g., computing device 110, such as by or via predictive model training module 120 for use in training predictive models) comprising a set of utterances and, for each utterance, a set of recordings (e.g., eight recordings, one for each electrode). The dataset may be stored in, for example, database 155.

Feature engineering may be applied to the dataset (by or via, e.g., computing device 110, such as a predictive model training module 120). Feature engineering may comprise signal smoothing, defining individual signals, and feature selection. Feature engineering may be applied after smoothing the dataset to decrease noise. Feature engineering may comprise a process of selecting a subset of informative features and/or the combination of distinct features into new features in order to obtain a representation that enables classification via machine learning algorithms. Machine learning is a subset of artificial intelligence application, and involves the design of efficient and accurate prediction algorithms. Deep learning refers to machine learning strategies relying on artificial neural networks, which are algorithms that structurally and functionally emulate the human brain. These artificial neural networks are multilayered, with convolutional layer combining an initial input from large databases and communicating an output to deep processing layers acting as filters. These filters recognize patterns in the original data, creating hierarchic estimations of patterns, called concepts. Voice and speech recognition may rely on artificial neural networks (ANNs) for further refinement of recognition capabilities. ANNs can create nonlinear models that best match nonlinear phenomena.

In example embodiments, once smoothed, individual sEMG signals were analyzed (e.g., by or via computing device 110, such as predictive model training module 130) to identify differences between the signals for "Tedd" and "Ed" utterances and select features for machine learning processing. The feature data for the machine learning algorithms may comprise of a vector of all zero values except for a 1 in elements in which the target sEMG feature was represented. The outputs were the uttered one syllable words: 0 when "Tedd" was silently uttered, and 1, when "Ed" was silently uttered. The data was randomly assigned to two data samples: 80% was used as "training" sample, allowing for ANN training and error adjustment, and 20% was used as "validation" sample to measure network generalization. A testing sample may also be used for independent measure of network performance. The training and validation samples may be used for building of predictive models. ANN model selection may rely on the accuracy of the word prediction. Selected models may be used to generate predictions, which may in turn be used for model selection by comparing model accuracy and predictors.

In an example embodiment, using six sEMG sensors on a subject laryngectomee's non-radiated hemi-face and neck, EMG data was recorded while the subject was mouthing "Tedd" and "Ed" 75 times each. A 60 Hz notch filter and 15-50 Hz bandpass filter were applied to remove electronic interference from AC current. The data was then split to generate training data and validation data, which was processed using Python SDK (by or via, e.g., computing device 110, such as predictive model training module 120). The training data sample was used to compare the effectiveness of pattern recognition of several machine learning modes.

For the classification of ten digits using a cascaded machine learning model, an accuracy of 0.92 was achieved, in example embodiments. This enabled the translation of the subject's silent mouthed speech into text and synthesized speech as an alternative means of communication (by or via, e.g., computing device 110, such as predictive model application module 130).

Figure 3:
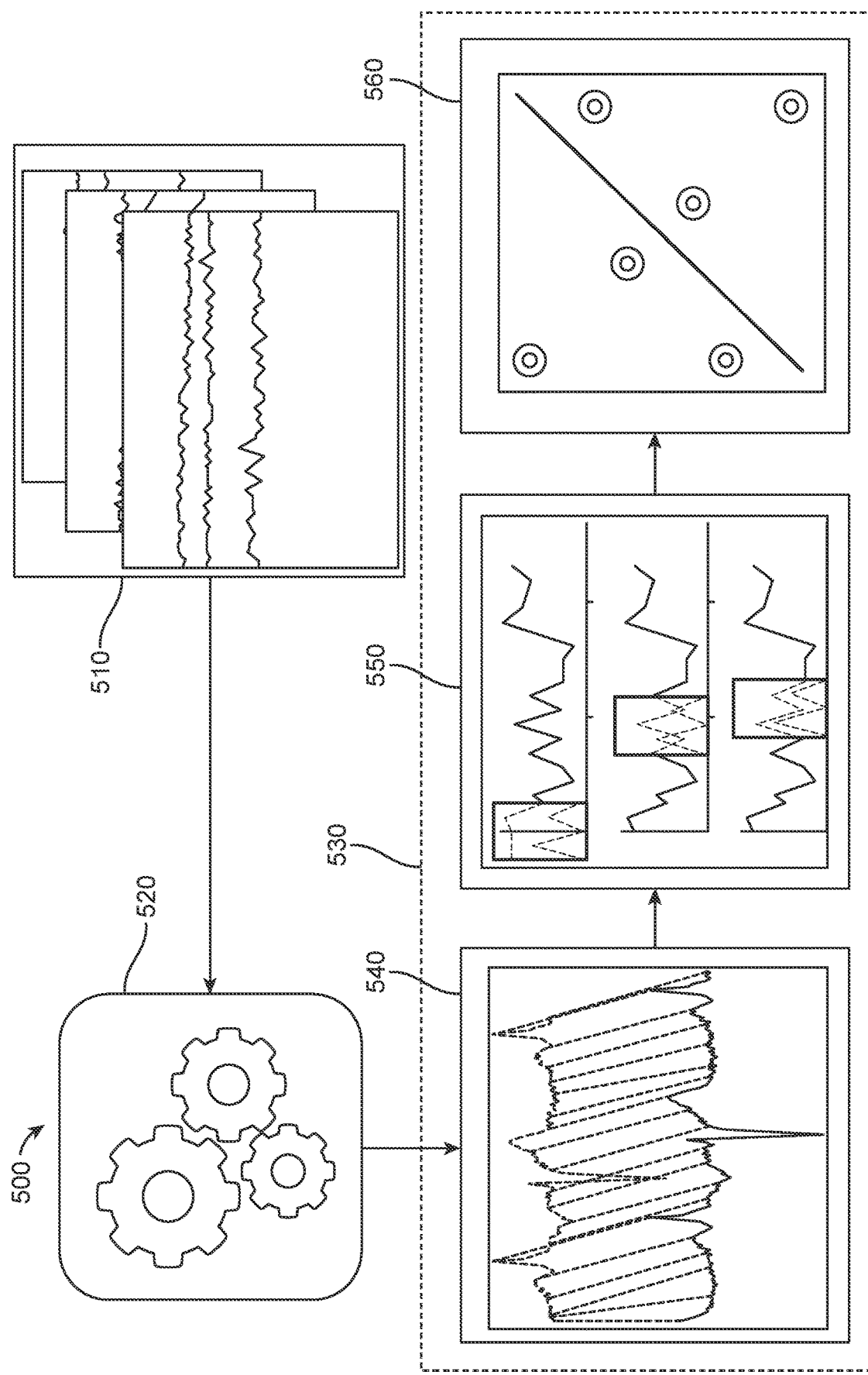
FIG. 3 depicts an example process for speech recognition using cascaded classification predictive model according to various potential embodiments.

FIG. 3 depicts a modeling approach 500 for applying a model to predict utterances of subjects. EMG signals 510 may be recorded and preprocessed 520, in which smoothing, filtering, etc., may be performed. Preprocessing 520 may yield a preprocessed dataset, which may be fed to a cascaded classification model 530. Global shape matching 540 may be performed on the preprocessed dataset, followed by local feature extraction 550, and prediction using one or more selected classifiers at 560.

Figure 4:
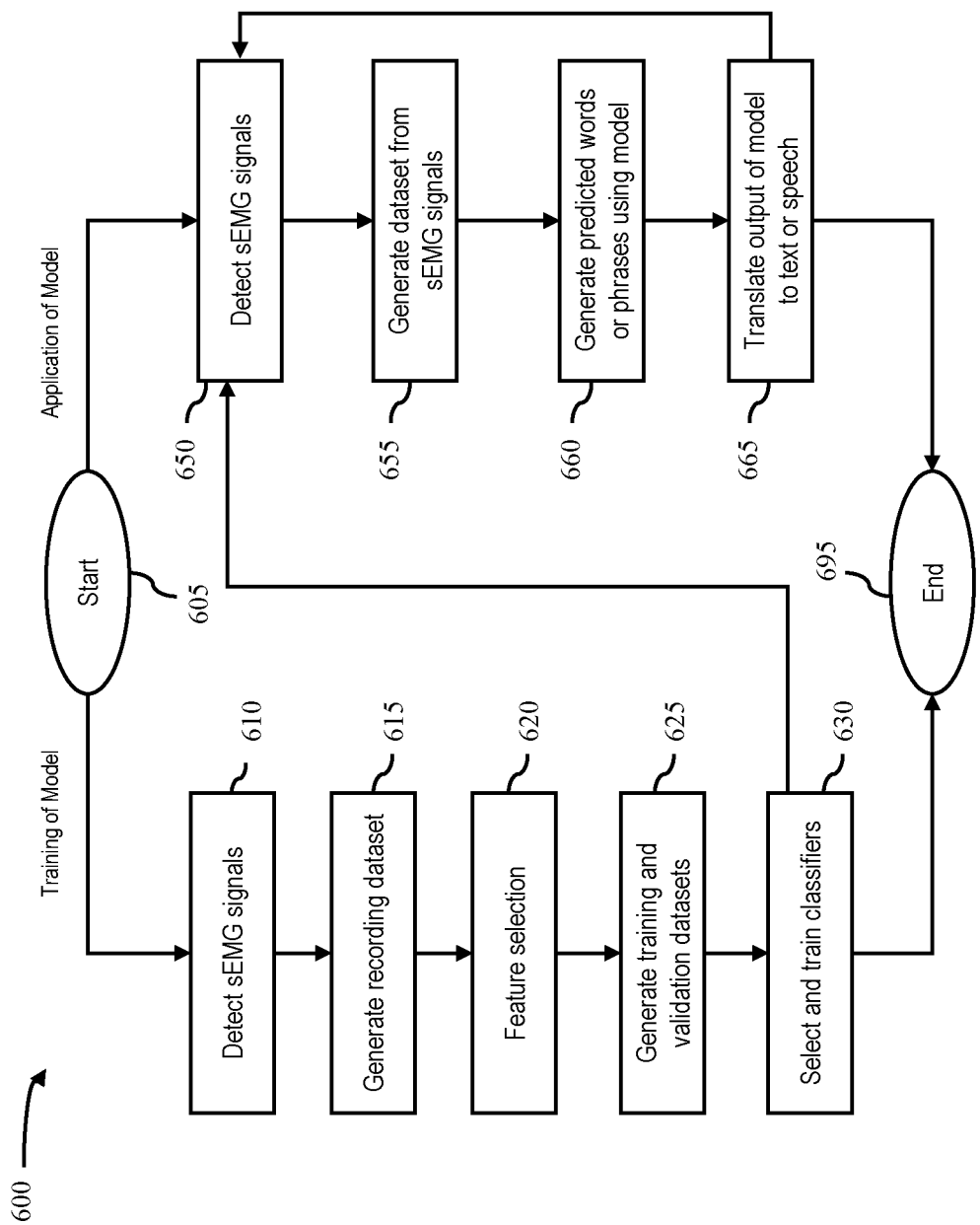
FIG. 4 depicts a process of training and applying a predictive model for speech recognition based on sEMG data according to various potential embodiments.

Referring to FIG. 4, an example process 600 is illustrated, according to various potential embodiments. Process 600 may be implemented by or via computing device 110. Process 600 may begin (605) with model training (branch on left side), which may be implemented by or via predictive model training module 120, if a suitable trained model is not already available (e.g., in database 155), or if model selection or refinement is to continue. Alternatively, process 600 may begin (605) with application of a trained model (branch on right side), which may be implemented by or via predictive model application module 130, if a suitable trained model is available. In various embodiments, process 600 may comprise both model training (e.g., steps 610-630) followed by model application (e.g., steps 660-665).

At 610, sEMG signals may be recorded from one or more subjects (e.g., using personal devices 160). At 615, a recording dataset may be generated from the recorded signals. The recording dataset may comprise a set of utterances and, for each utterance, recordings from each electrode used to record the sEMG signals. At 620, feature selection may be performed to identify distinguishing characteristics of signals for utterances and select features thereof for machine learning. At 625, training and validation dataset may be generated, and at 630, the training and validation datasets may be used to select and train classifiers. Process 600 may end at 695, or proceed to model application.

At 650 (which may be performed at start 605, or following step 630), sEMG signals are detected for a subject for whom utterances are to be, for example, translated into text or synthesized speech. At 655, a dataset is generated from the sEMG signals. The dataset may comprise a series of signal recordings for each electrode corresponding to one or more articulatory muscles. At 660, the dataset may be fed to a trained predictive model to generate predicted words or phrases corresponding to the sEMG signals recorded during utterances by the subject. At 665, the output of the model (comprising, e.g., predictions) may be presented as, for example, text and/or synthesized speech, and/or may be stored (e.g., in database 155). Process 600 may return to step 650 so as to continue recording sEMG signals to recognize subsequent speech, or may end at 695.

Figure 6:
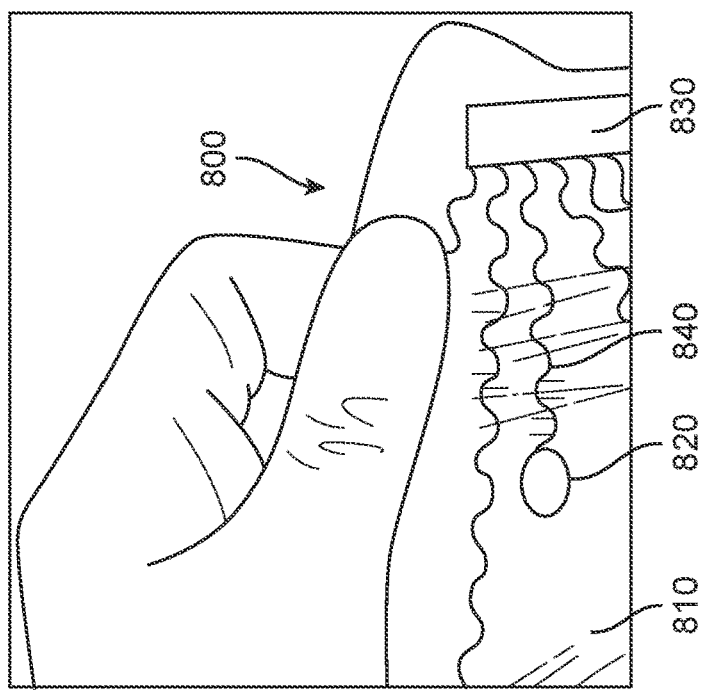
FIG. 6 shows an example fabricated personal device according to various potential embodiments.
Figure 5:
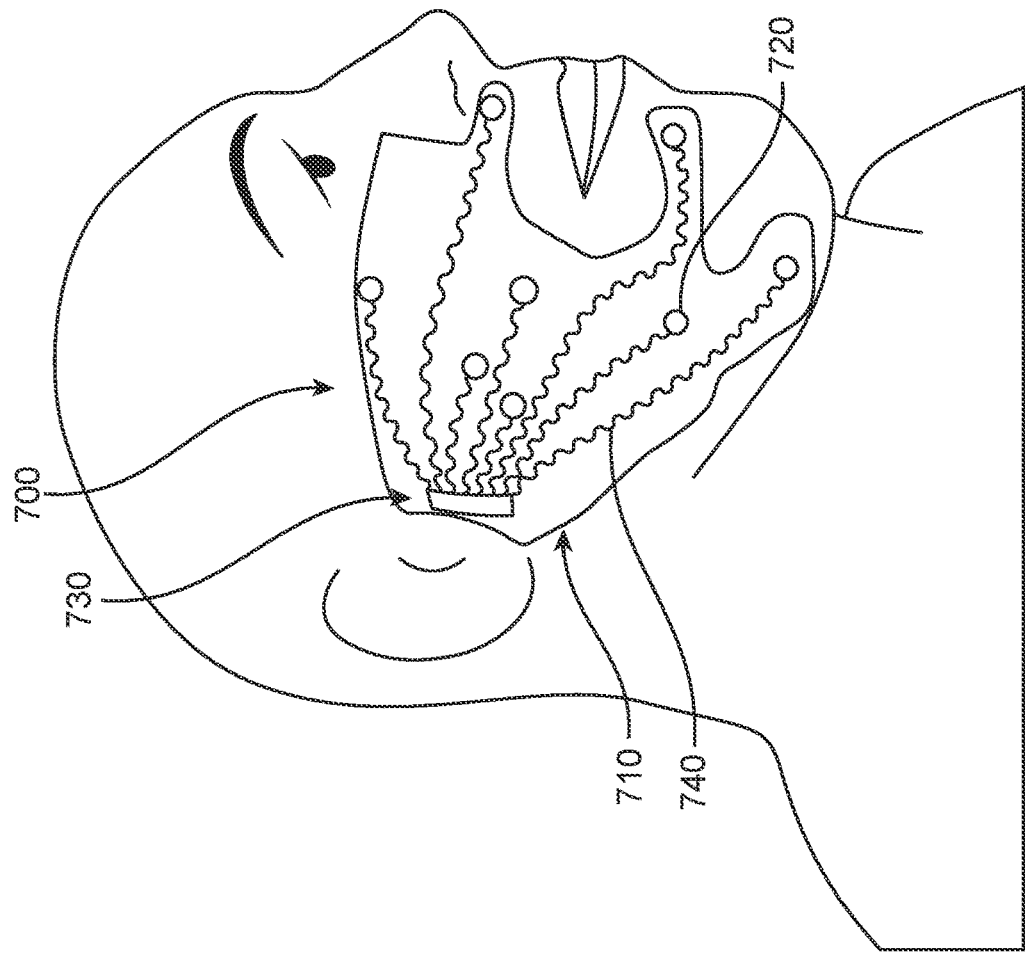
FIG. 5 depicts an example hemi-face personal device according to various potential embodiments.
Figure 7:
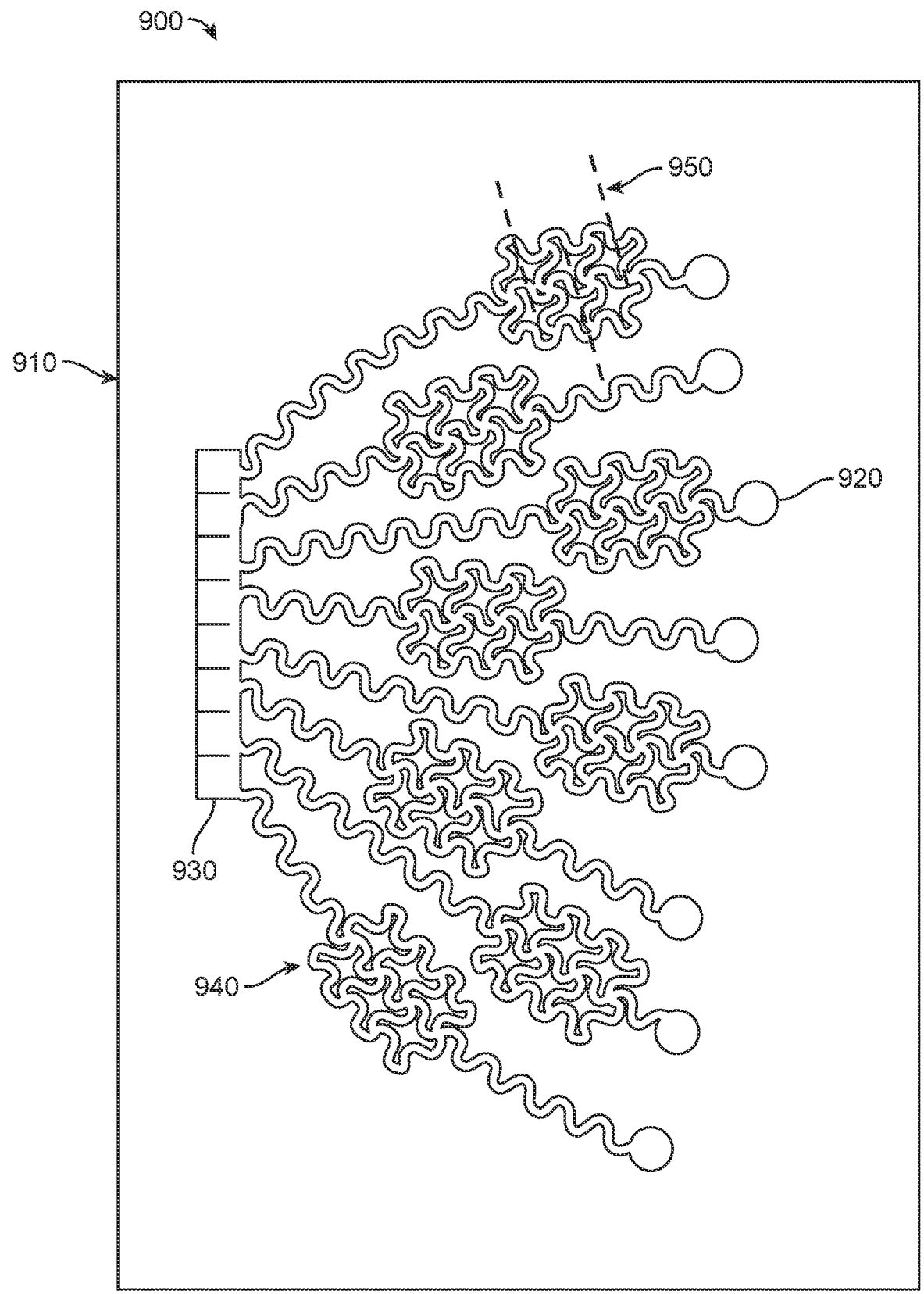
FIG. 7 depicts an example personal device with reconfigurable arrays according to various potential embodiments.

Referring to FIGS. 5, 6, and 7, example embodiments of personal device 700, 800 according to various potential embodiments are illustrated. The personal device 700, 800, 900 may comprise or be, for example, a facial electrode tattoo. Personal device 700, 800, 900 may be a hemi-face device with sensors on one side of the subject's face, or may include sensors for both sides of the subject's face. Personal device 700, 800, 900 may comprise a body or housing 710, 810, 910 which may be a membrane in the versions depicted in FIGS. 5-7. The membrane may be a polyurethane membrane with various thicknesses. For example, the membrane may have a thickness of no greater than about 1 millimeter, no greater than about 500 microns, no greater than about 200 microns, no greater than about 100 microns, or no greater than about 50 microns. In certain embodiments, a membrane may have a thickness, for example, ranging from about 20 microns to about 30 microns. The membrane may serve as a flexible carrier for the sensors (discussed below), and may be securable to the subject's skin using, for example, a suitable adhesive.

The personal device 700, 800, 900 comprises a set of sensors 720, 820, 920, which may be electrodes capable of detecting sEMG signals non-invasively. In the versions shown in FIGS. 5 and 7, seven and eight electrodes are depicted, respectively, although the number of electrodes (and/or other sensors) may vary from, for example, four to 16 in various embodiments, for one or both sides of a subject's face and/or neck. One or two of the electrodes may be reference electrodes which may also be secured to the subject's skin. The reference electrodes may be positioned in various locations away from the articulatory muscles of interest, such as areas with lower or undetectable muscle activity (such as the wrist or ear). Electrode positions may be custom-fabricated for each patient, or may be fabricated with more generic configurations suited to multiple patients.

Personal device 700, 800, 900 may comprise a control module 730, 830, 930 with, for example, circuitry configured to receive, amplify, filter, and/or transmit detected signals. In various embodiments, the control module may comprise, for example, a printed circuit board (PCB) designed to acquire, amplify, and transmit data over a wireless transmitter employing any suitable communications protocol (e.g., "Bluetooth," Wi-Fi, etc.). The electrodes 720, 820, 920 or other sensors may be connected to the control module 730, 830, 930 through electrical pathways 740, 840, 940. Electrical pathways 740, 840, 940 may comprise, for example, metalized polyethylene terephthalate (PET), polytetrafluoroethylene (PTFE), polyimides, and/or polyvinyl chloride (PVC). The pathways 740, 840, 940 may be sufficiently thin to be flexible without significantly impacting the flexibility of the membrane. In various embodiments, the electrical pathways 740, 840, 940 may have a serpentine configuration so as to enhance flexibility in three dimensions. The version depicted in FIG. 7 is a potential design with reconfigurable arrays which may be cut and extended to adapt to different patient anatomies. Redundant electrical pathways 940 allow clinicians to cut (e.g., along one or more axes 950) or otherwise remove unneeded pathways and/or electrodes. In this way, a generic design may be used and adapted to fit many or all patients.

Figure 8:
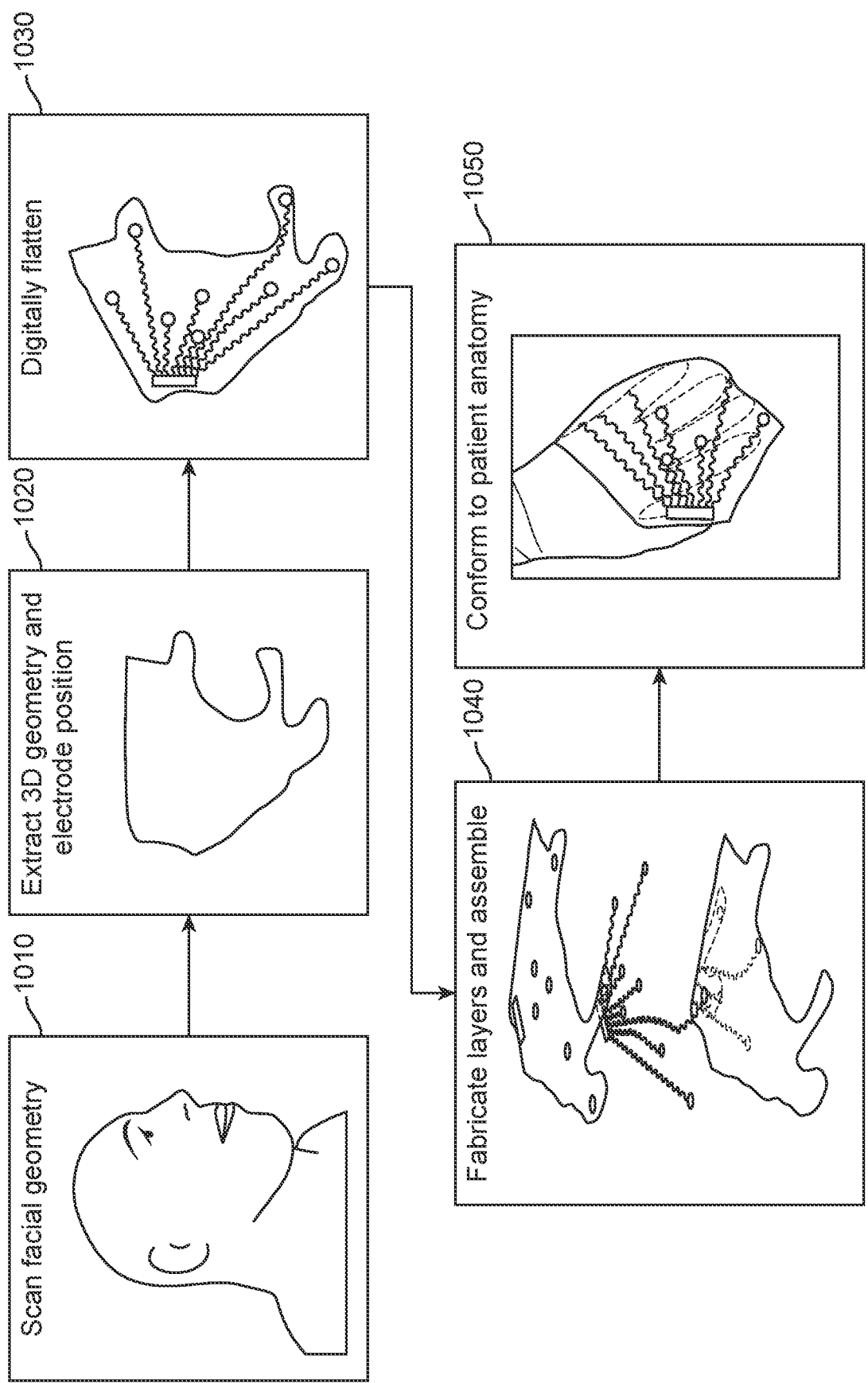
FIG. 8 depicts an example patient-specific manufacturing process for manufacturing the personal device of FIGS. 5-7 according to various potential embodiments.

Referring to FIG. 8, an example fabrication process is depicted according to various potential embodiments. At 1010, a subject's facial geometry may be scanned with any suitable 3D scanner or other imager. The 3D imager may generate a dataset comprising, for example, arrays, tensors, etc., as mathematical representations of the 3D image. At 1020, 3D geometry may be extracted from the dataset, and electrode positions determined based on portions of the image corresponding identified as corresponding to various articulatory muscles from which sEMG signals are to be detected. At 1030, the 3D geometry may be digitally flattened, and at 1040, various layers may be fabricated and assembled. At 1050, the fabricated personal device may be conformed to the subject's face and/or neck.

Figure 9:
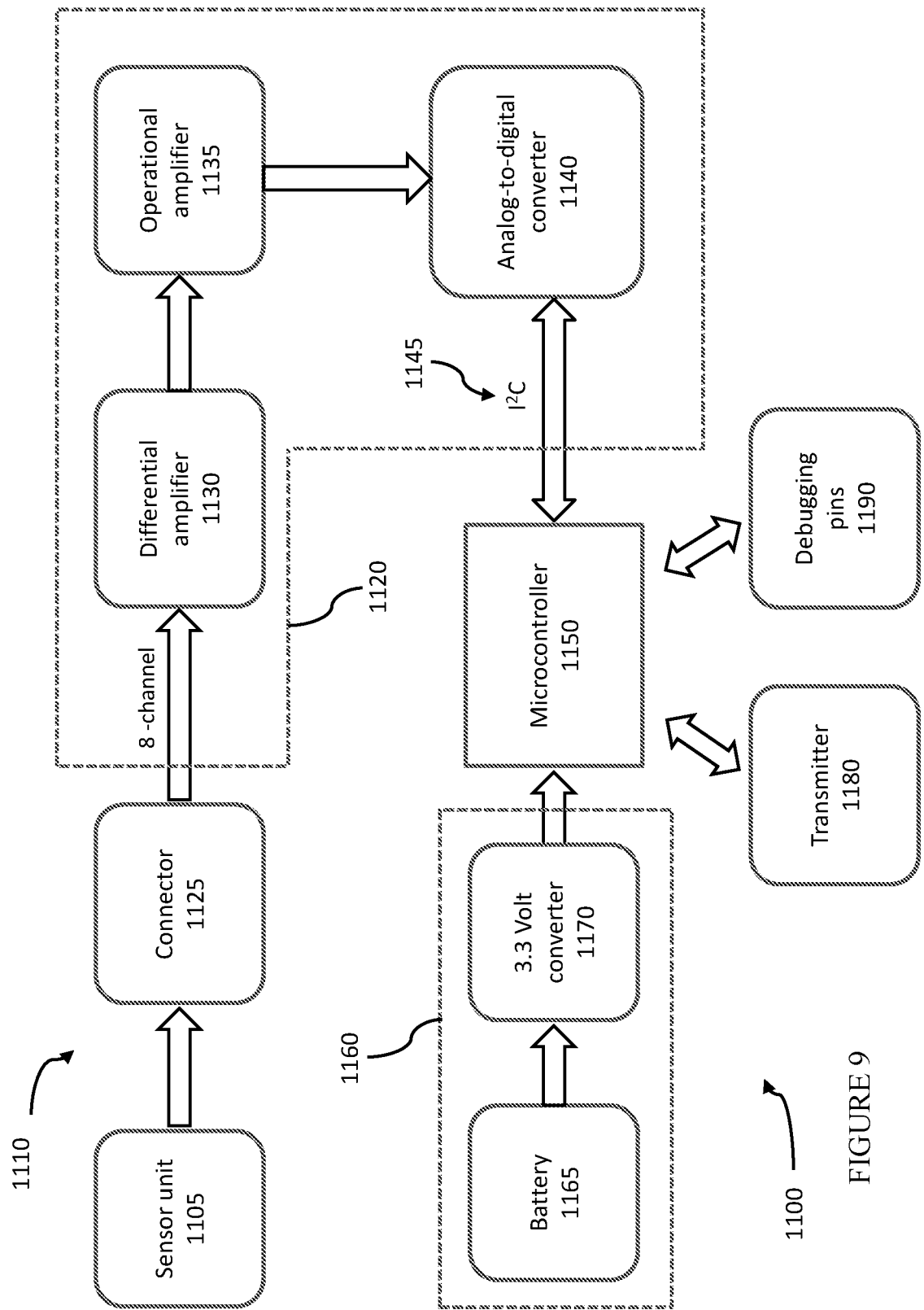
FIG. 9 provides an example EMG sensor electrical design block diagram according to various potential embodiments.

FIG. 9 illustrates an example electrical design block diagram for a personal device 1100 comprising a sensor unit 1105 (e.g., cutaneous sensor unit 165 with a set of sEMG sensors) connected to a control module 1110, according to various potential embodiments. The sensor unit 1105 (such as a facial sEMG tattoo comprising, e.g., a membrane, electrodes, and electrical pathways) may be connected to the control module 1110 via, for example, a connector 1110 (see also 1210 in FIG. 10). Connector 1110 may be or may comprise, for example, a micro-ribbon connector, such as an 8-channel micro-ribbon connector (e.g., Molex 15166-0075). The connector 1125 may be connected to signal processing unit 1120 (such as a signal acquisition unit 185), which may comprise a differential amplifier 1130, such as an Analog Devices LT1167 series instrumentation amplifier. The signal processing unit 1120 may additionally or alternatively comprise an operational amplifier ("op amp") 1135, such as an Analog Devices LT1112 picoamp input op amp. The operational amplifier 1135 may be connected to an analog-to-digital converter ("ADC") 1140, such as an 8-channel ADC.

Figure 10:
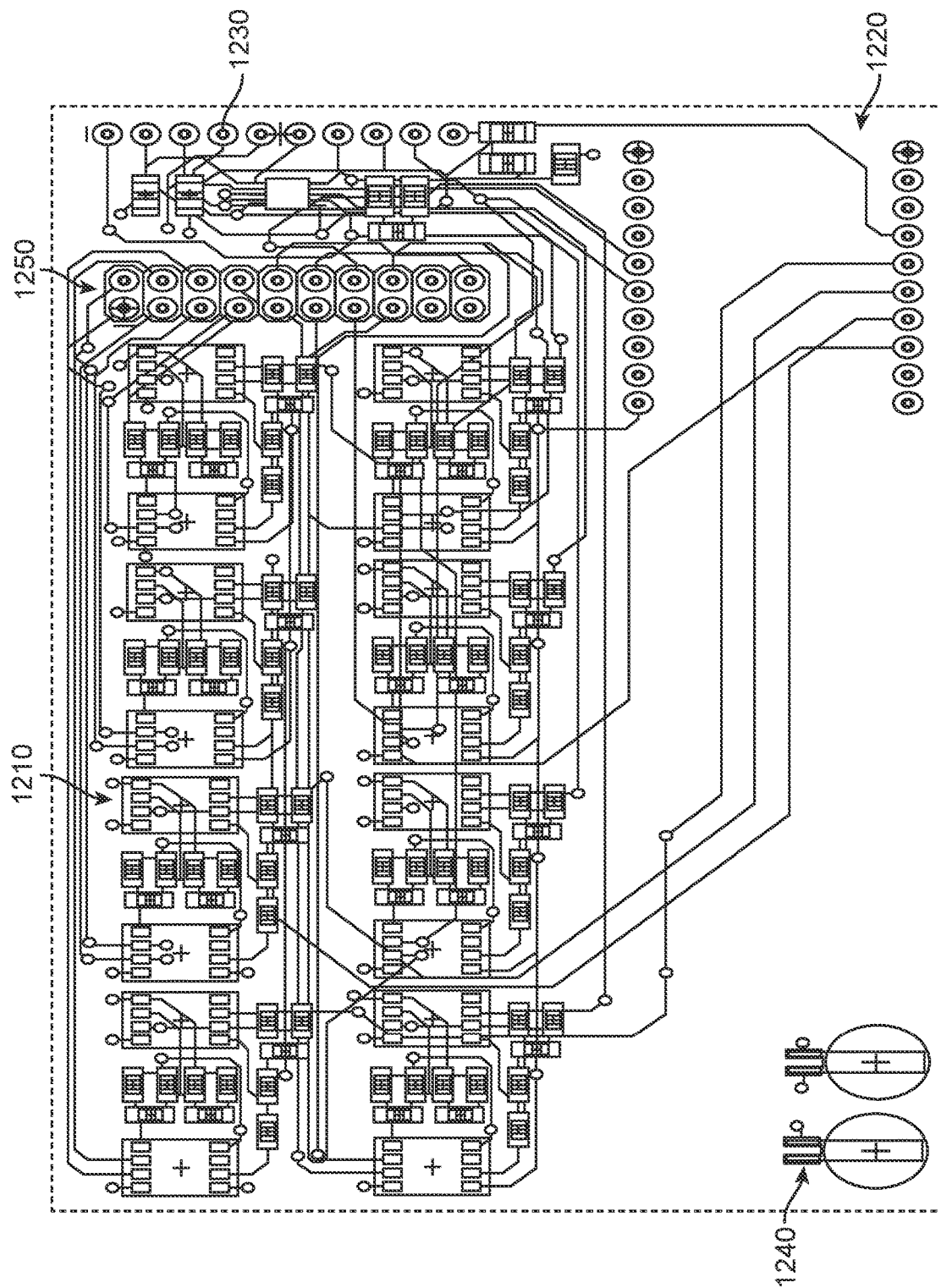
FIG. 10 provides an example wireless EMG circuit according to various potential embodiments.

The control module 1100 may comprise a microcontroller 1150, which may be connected to ADC 1140 via an Inter-Integrated Circuit (I²C) serial connector 1145 (see also 1220 and 1230 in FIG. 10). The microcontroller 1150 may be or may comprise, for example, a MellBell Electronics PICO board. The control module 1100 may also comprise, or be connected to, a power supply 1160. In certain embodiments, power supply 1160 may comprise a battery 1165 connected to microcontroller 1150 via a DC/DC converter 1170 (see also 1240 in FIG. 10). Microcontroller 1150 may also be connected to or may comprise a transmitter 1180 for wirelessly transmitting detected signals (or data based on detected signals). Microcontroller 1180 may also be connected to a set of debugging pins 1180 (see also 1250 in FIG. 10).

Various potential embodiments of the disclosed approach may include, without limitation, one or more of, or any combination of:

Embodiment A: A system for recognizing speech by detecting surface electromyographic (sEMG) signals from a face and/or a neck of a subject, the system including a personal device comprising: a cutaneous sensor unit comprising a set of electrodes configured to detect sEMG signals from a corresponding set of articulatory muscles during silent utterances by the subject; and a control module coupled to the electrodes via a corresponding set of electrical pathways, the control module comprising: a signal acquisition circuit for acquiring, via corresponding electrical pathways, sEMG signals detected by the electrodes; and a wireless communication circuit configured to transmit data corresponding to the signals acquired via the signal acquisition circuit to a computing device for speech recognition.

Embodiment B: The system of any combination of Embodiments A and/or C-M, wherein the personal device is configured to detect sEMG signals from a hemi-face of the subject.

Embodiment C: The system of any combination of Embodiments A, B, and/or D-M, wherein the cutaneous sensor unit includes a facial electrode tattoo comprising a membrane, the set of electrodes, and the set of electrical pathways.

Embodiment D: The system of any combination of Embodiments A-C and/or E-M, wherein the cutaneous sensor unit comprises a polyurethane membrane with a thickness of no greater than about 300 microns.

Embodiment E: The system of any combination of Embodiments A-D and/or F-M, wherein the electrical pathways comprise a metalized conducting film comprising polyethylene terephthalate (PET), polytetrafluoroethylene (PTFE), polyimides, and/or polyvinyl chloride (PVC).

Embodiment F: The system of any combination of Embodiments A-E and/or G-M, wherein the personal device comprises a configurable array of redundant electrical pathways.

Embodiment G: The system of any combination of Embodiments A-F and/or H-M, wherein the cutaneous sensor unit comprises a membrane configured to adhere to the face and/or neck of the subject.

Embodiment H: The system of any combination of Embodiments A-G and/or I-M, wherein the signal acquisition circuit comprises an amplifier configured to amplify signals acquired from the electrodes.

Embodiment I: The system of any combination of Embodiments A-H and/or J-M, wherein the personal device comprises at least six electrodes.

Embodiment J: The system of any combination of Embodiments A-I and/or K-M, further comprising the computing device, wherein the computing device comprises a processor configured to receive data from the control module and generate predictions of words uttered by the subject.

Embodiment K: The system of any combination of Embodiments A-J, L, and/or M, wherein the processor of the computing device is configured to apply a predictive machine learning model to the data received from the control module, the predictive machine learning model trained using recordings corresponding to discrete words or phrases spoken by one or more subjects.

Embodiment L: The system of any combination of Embodiments A-K and/or M, wherein the predictive model applies a cascaded machine learning model comprising global shape matching, local feature extraction, and classification.

Embodiment M: The system of any of Embodiments A-L, wherein the predictive model uses one or more artificial neural networks.

Embodiment N: A method for recognizing speech by a subject, the method comprising: detecting, using a cutaneous sensor unit of a personal device, surface electromyographic (sEMG) signals from articulatory muscles in a face and/or a neck of the subject during silent utterances by the subject, the cutaneous sensor unit comprising one or more electrodes positioned at each articulatory muscle, each electrode coupled to a control unit of the personal device via an electrical pathway; applying, by a computing device, a predictive machine learning model to data based on the detected sEMG signals to generate predictions of words uttered by the subject, the predictive machine learning model trained using data collection recordings comprising discrete words or phrases spoken by one or more subjects; and presenting, by the computing device, the predictions of words uttered by the subject as readable text on a display or as audible synthesized speech from an audio source.

Embodiment O: The method of any combination of Embodiments N, P, and/or Q, wherein the electrodes and electrical pathways are embedded in a membrane that is adherable to a hemi-face of the subject.

Embodiment P: The method of any combination of Embodiments N, O, and/or Q, further comprising positioning the personal device at a hemi-face of the subject such that the electrodes make contact with the plurality of articulatory muscles at the hemi-face.

Embodiment Q: The method of any combination of Embodiments N-P, further comprising scanning the face of the subject to obtain facial geometry data, wherein the electrodes are positioned based on the facial geometry data.

Embodiment R: A method for training a machine learning predictive model to predict words or phrases uttered by subjects during silent speech based on surface electromyographic (sEMG) signals, the method comprising: detecting, using a cutaneous sensor unit of a personal device, sEMG signals from articulatory muscles in a hemi-face of a subject during silent utterances of a set of words or phrases, the cutaneous sensor unit comprising a set of electrodes positioned at articulatory muscles of the subject; generating, via a computing device, a recording dataset comprising a plurality of words or phrases and, for each word or phrase, a set of signals corresponding to the set of electrodes of the cutaneous sensor unit; identifying, via the computing device, differences between signals corresponding to the plurality of words or phrases and selecting distinct features of the words or phrases; generating, via the computing device, a training dataset and a validation dataset from the recording dataset; and selecting, via the computing device, based on the training dataset and the validation dataset, a classifier and training the predictive model to receive as inputs data based on sEMG signals detected during utterances by the subject and generate predicted words or phrases as outputs based on the classifier.

Embodiment S: The method of Embodiment R, wherein the predictive model is a cascaded machine learning model comprising global shape matching, local feature extraction, and classification.

Embodiment T: A method of manufacturing a personal device for detecting surface electromyographic (sEMG) signals from a face and/or a neck of a subject, the method comprising: obtaining three-dimensional (3D) contour data acquired by scanning, using a 3D scanner, a face and/or a neck of a subject; extracting, via a computing device, 3D geometry data from the contour data and identifying a set of positions corresponding to articulatory muscles of the subject; generating, by the computing device, fabrication data for a membrane and a set of electrodes corresponding to the set of positions of the articulatory muscles, wherein generating the fabrication data comprises digitally flattening the contour data; and fabricating the membrane and the set of electrodes using the fabrication data.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the terms "exemplary," "example," "potential," and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the Figures. It should be noted that the orientation of various elements may differ according to other exemplary embodiments, and that such variations are intended to be encompassed by the present disclosure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system for recognizing speech by detecting surface electromyographic (sEMG) signals from a face and/or a neck of a subject, the system including a personal device comprising:
   a cutaneous sensor unit comprising a set of electrodes configured to detect sEMG signals from a corresponding set of articulatory muscles during silent utterances by the subject; and
   a control module coupled to the electrodes via a corresponding set of electrical pathways, the control module comprising:
      a signal acquisition circuit for acquiring, via corresponding electrical pathways, sEMG signals detected by the electrodes; and
      a wireless communication circuit configured to transmit data corresponding to the signals acquired via the signal acquisition circuit to a computing device for speech recognition,
   wherein the system comprises one or more processors configured to apply a predictive model to the data from the control module to generate predictions of words uttered by the subject, the predictive model comprising a cascaded machine learning model, the cascaded machine learning model being configured to perform cascaded classification comprising:
      global shape matching on a first dataset to generate shape-matched data, the first dataset corresponding to the sEMG signals detected by the electrodes as the subject uttered the words,
      local feature extraction on the shape-matched data from the global shape matching to generate a second dataset, and
      application of a trained classifier to the second dataset from the local feature extraction to obtain the predictions of words uttered by the subject.

2. The system of claim 1, wherein the personal device is configured to detect sEMG signals from a hemi-face of the subject.

3. The system of claim 1, wherein the cutaneous sensor unit includes a facial electrode tattoo comprising a membrane, the set of electrodes, and the set of electrical pathways.

4. The system of claim 1, wherein the cutaneous sensor unit comprises a polyurethane membrane with a thickness of no greater than about 300 microns.

5. The system of claim 1, wherein the electrical pathways comprise a metalized conducting film comprising polyethylene terephthalate (PET), polytetrafluoroethylene (PTFE), polyimides, and/or polyvinyl chloride (PVC).

6. The system of claim 1, wherein the personal device comprises a configurable array of redundant electrical pathways.

7. The system of claim 1, wherein the cutaneous sensor unit comprises a membrane configured to adhere to the face and/or neck of the subject.

8. The system of claim 1, wherein the signal acquisition circuit comprises an amplifier configured to amplify signals acquired from the electrodes.

9. The system of claim 1, wherein the personal device comprises at least six electrodes.

10. The system of claim 1, further comprising the computing device, wherein the computing device comprises a processor configured to receive data from the control module and generate the predictions of words uttered by the subject.

11. The system of claim 10, wherein the processor of the computing device is one of the one or more processors of the system, and wherein the predictive model trained using recordings corresponding to discrete words or phrases spoken by one or more subjects.

12. The system of claim 1, wherein the predictive model uses one or more artificial neural networks.

13. The system of claim 1, wherein the computing device comprises a processor configured to receive data from the control module and generate the predictions of words uttered by the subject using a machine learning predictive model, the machine learning predictive model trained to predict words or phrases uttered by the subject during silent speech based on surface electromyographic (sEMG) signals, wherein the machine learning predictive model was trained via a method comprising:
    detecting, using the cutaneous sensor unit of a personal device, sEMG signals from articulatory muscles in a hemi-face of the subject during silent utterances of a set of words or phrases, the cutaneous sensor unit comprising a set of electrodes positioned at articulatory muscles of the subject;
    generating, via the computing device, a recording dataset comprising a plurality of words or phrases and, for each word or phrase, a set of signals corresponding to the set of electrodes of the cutaneous sensor unit;
    identifying, via the computing device, differences between signals corresponding to the plurality of words or phrases and selecting distinct features of the words or phrases;
    generating, via the computing device, a training dataset and a validation dataset from the recording dataset; and
    selecting, via the computing device, based on the training dataset and the validation dataset, a classifier and training the predictive model to receive as inputs data based on sEMG signals detected during utterances by the subject and generate predicted words or phrases as outputs based on the classifier.

14. The system of claim 1, the electrical pathways having a serpentine configuration for flexibility in three dimensions.

15. The system of claim 1, wherein the system is further capable of presenting the predictions of words uttered by the subject both as readable text on a display and as audible synthesized speech from an audio source.

16. The system of claim 1, the cutaneous sensor unit being fabricated, based at least in part on a scan of the face and/or the neck of the subject, such that the set of electrodes are positioned at functional articulatory muscles of the subject with one or more electrodes positioned at an orbicularis oris muscle of the subject.

17. A method for recognizing speech by a subject, the method comprising:
    detecting, using a cutaneous sensor unit of a personal device, surface electromyographic (sEMG) signals from articulatory muscles in a face and/or a neck of the subject during silent utterances by the subject, the cutaneous sensor unit comprising one or more electrodes positioned at each articulatory muscle, each electrode coupled to a control unit of the personal device via an electrical pathway;
    applying, by a computing device, a predictive machine learning model to data based on the detected sEMG signals to generate predictions of words uttered by the subject, the predictive machine learning model comprising a cascaded machine learning model, the cascaded machine learning model configured to perform cascaded classification comprising (i) global shape matching on a first dataset to generate shape-matched data, the first dataset corresponding to the sEMG signals detected by the electrodes as the subject uttered the words, (ii) local feature extraction on the shape-matched data from the global shape matching to generate a second dataset, and (iii) application of a trained classifier to the second dataset from the local feature extraction to obtain the predictions of words uttered by the subject, the predictive machine learning model trained using data collection recordings comprising discrete words or phrases spoken by one or more subjects; and
    presenting, by the computing device, the predictions of words uttered by the subject as readable text on a display or as audible synthesized speech from an audio source.

18. The method of claim 17, wherein the electrodes and electrical pathways are embedded in a membrane that is adherable to a hemi-face of the subject.

19. The method of claim 17, further comprising positioning the personal device at a hemi-face of the subject such that the electrodes make contact with a plurality of articulatory muscles at a hemi-face of the subject.

20. The method of claim 17, further comprising scanning the face of the subject to obtain facial geometry data, wherein the electrodes are positioned based on the facial geometry data.

21. The method of claim 20, further comprising scanning the face and/or the neck of the subject, and fabricating, based on the facial geometry data, the cutaneous sensor unit such that electrodes are positioned at functional articulatory muscles of the subject with one or more electrodes positioned at an orbicularis oris muscle of the subject.

22. The method of claim 17, wherein the first dataset is a preprocessed dataset obtained by preprocessing a recording dataset, the recording dataset comprising, for each word or phrase uttered by the subject, a set of signals detected via the cutaneous sensor unit, and wherein the second dataset is a feature dataset.

23. The method of claim 17, wherein the computing device is a first computing device, and wherein the method further comprises manufacturing the personal device for detecting the sEMG signals from the face and/or the neck of the subject by:
    obtaining three-dimensional (3D) contour data acquired by scanning, using a 3D scanner, the face and/or the neck of the subject;
    extracting, via the first computing device or a second computing device, 3D geometry data from the contour data and identifying a set of positions corresponding to the articulatory muscles of the subject; and
    generating, by the first computing device or the second computing device, fabrication data for a membrane and a set of electrodes corresponding to the set of positions of the articulatory muscles, wherein the set of electrodes comprises the one or more electrodes, and wherein generating the fabrication data comprises digitally flattening the contour data; and fabricating the membrane and the set of electrodes using the fabrication data.

24. The method of claim 17, wherein the sEMG signals comprise signals from an orbicularis oris muscle of the subject.

25. The method of claim 17, comprising presenting the predictions of words uttered by the subject both as readable text on the display and as audible synthesized speech from the audio source.

* * * * *